US012773781B1

(12) United States Patent
Ebrahimi Afrouzi et al.

(10) Patent No.: US 12,773,781 B1
(45) Date of Patent: Oct. 27, 2026

(54) METHOD FOR EFFICIENT OPERATION OF MOBILE ROBOTIC DEVICES

(71) Applicants: Ali Ebrahimi Afrouzi, Henderson, NV (US); Chen Zhang, Redmond, WA (US)

(72) Inventors: Ali Ebrahimi Afrouzi, Henderson, NV (US); Chen Zhang, Redmond, WA (US)

(73) Assignee: Bobsweep USA, Las Vegas, NV (US)

( * ) Notice: Subject to any disclaimer, the term of this patent is extended or adjusted under 35 U.S.C. 154(b) by 0 days.

(21) Appl. No.: 19/185,777

(22) Filed: Apr. 22, 2025

Related U.S. Application Data

(63) Continuation of application No. 17/895,999, filed on Aug. 25, 2022, now Pat. No. 12,280,509, which is a continuation of application No. 17/109,868, filed on Dec. 2, 2020, now Pat. No. 11,458,628, which is a continuation of application No. 15/976,853, filed on May 10, 2018, now Pat. No. 10,882,186.

(60) Provisional application No. 62/505,060, filed on May 11, 2017.

(51) Int. Cl.
*B25J 9/16* (2006.01)
*B25J 11/00* (2006.01)

(52) U.S. Cl.
CPC ......... *B25J 9/1666* (2013.01); *B25J 11/0085* (2013.01); *Y10S 901/01* (2013.01); *Y10S 901/02* (2013.01)

(58) Field of Classification Search
CPC .... B25J 9/1666; B25J 11/0085; Y10S 901/02; Y10S 901/01
USPC .................................................. 700/245–264
See application file for complete search history.

(56) References Cited

U.S. PATENT DOCUMENTS

| | | | | | | |
|---|---|---|---|---|---|---|
| 4,706,327 | A | * | 11/1987 | Getz | A47L 9/0411 | 15/354 |
| 4,782,550 | A | * | 11/1988 | Jacobs | A47L 11/4061 | 180/203 |
| 4,962,453 | A | * | 10/1990 | Pong, Jr. | A47L 11/4011 | 180/167 |
| 5,023,444 | A | * | 6/1991 | Ohman | G01V 8/14 | 250/221 |
| 5,109,566 | A | * | 5/1992 | Kobayashi | A47L 11/4011 | 15/340.1 |
| 5,111,401 | A | * | 5/1992 | Everett, Jr. | G05D 1/0242 | 180/169 |
| 5,293,955 | A | | 3/1994 | Lee | | |
| 5,307,273 | A | * | 4/1994 | Oh | A47L 11/4011 | 901/1 |

(Continued)

*Primary Examiner* — Jaime Figueroa

(57) ABSTRACT

A method for autonomously planning work duties of a robot within an environment of the robot, including: obtaining, with a processor of the robot, first data indicative of a presence or an absence of at least one human within the environment at a particular time; actuating, with the processor, the robot to execute work duties based on the first data, wherein: the robot executes the work duties when the first data indicates the absence of the at least one human from the environment; and the work duties comprise cleaning at least a portion of the environment; capturing, with at least one sensor of a plurality of sensors disposed on the robot, second data while the robot executes the work duties; and altering, with the processor, a navigational route of the robot or the work duties based on the second data.

20 Claims, 5 Drawing Sheets

(56) References Cited

U.S. PATENT DOCUMENTS

| | | | | |
|---|---|---|---|---|
| 5,321,614 | A * | 6/1994 | Ashworth | G05D 1/0227 318/587 |
| 5,568,589 | A * | 10/1996 | Hwang | A47L 11/4011 706/900 |
| 6,594,844 | B2 | 7/2003 | Jones | |
| 7,155,308 | B2 | 12/2006 | Jones | |
| 7,430,455 | B2 | 9/2008 | Casey | |
| 7,805,220 | B2 * | 9/2010 | Taylor | G05D 1/0219 318/568.17 |
| 9,380,922 | B2 * | 7/2016 | Duffley | G05D 1/0016 |
| 10,123,674 | B2 * | 11/2018 | Gordon | A47L 9/2815 |
| 10,168,709 | B2 | 1/2019 | Kleiner | |
| 10,310,507 | B2 | 6/2019 | Kleiner | |
| 2005/0000543 | A1 * | 1/2005 | Taylor | G05D 1/0219 134/18 |
| 2005/0010331 | A1 * | 1/2005 | Taylor | G05D 1/0219 318/568.12 |
| 2006/0001545 | A1 * | 1/2006 | Wolf | A47K 3/001 340/686.1 |
| 2013/0184980 | A1 | 7/2013 | Ichikawa | |
| 2014/0207280 | A1 * | 7/2014 | Duffley | G05D 1/0016 700/257 |
| 2014/0207281 | A1 | 7/2014 | Angle | |
| 2016/0282862 | A1 * | 9/2016 | Duffley | G05D 1/0274 |
| 2016/0309973 | A1 | 10/2016 | Sheikh | |
| 2017/0049288 | A1 | 2/2017 | Knutson | |
| 2017/0192435 | A1 | 7/2017 | Bakhishev | |
| 2018/0070787 | A1 * | 3/2018 | Gordon | A47L 9/2815 |
| 2018/0074508 | A1 | 3/2018 | Kleiner | |
| 2018/0078106 | A1 * | 3/2018 | Scholten | A47L 9/009 |
| 2018/0211103 | A1 | 7/2018 | Sohn | |
| 2018/0284786 | A1 | 10/2018 | Moshkina-Martinson | |
| 2018/0311822 | A1 | 11/2018 | Kaminka | |
| 2019/0320867 | A1 | 10/2019 | Noh | |
| 2020/0047337 | A1 | 2/2020 | Williams | |
| 2020/0047343 | A1 | 2/2020 | Bal | |

* cited by examiner

METHOD FOR EFFICIENT OPERATION OF MOBILE ROBOTIC DEVICES

CROSS-REFERENCE TO RELATED APPLICATIONS

This application is a Continuation of U.S. Non-Provisional patent application Ser. No. 17/895,999, filed Aug. 25, 2022, which is a Continuation of U.S. Non-Provisional patent application Ser. No. 17/109,868, filed Dec. 2, 2020, which is a Continuation of U.S. Non-Provisional patent application Ser. No. 15/976,853, filed May 5, 2018, which claims the benefit of U.S. Provisional Patent Application No. 62/505,060, filed May 11, 2017, each of which is hereby incorporated by reference.

FIELD OF THE DISCLOSURE

The disclosure relates to mobile robotic devices generally and more specifically to how mobile robotic devices operate in a work environment.

BACKGROUND

Sensory detection is important for mobile robotic devices. Mobile robotic devices must be able to detect obstacles to avoid running into them and damaging the obstacle or the robotic device itself. Additionally, changes in surface type that a mobile robotic device operates on can impact the functions of the robot. For example, a robot may not be able to operate effectively on a particular type of surface. Surface types may also impact the functions a robot can partake in. Inefficiencies in the prior art remain. A need exists for mobile robotic devices to be able to autonomously plan the most efficient work operational plan through a work environment that incorporates considerations regarding the status of the work environment itself.

SUMMARY

The following present a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

One aspect includes a method for autonomously planning work duties of a robot within an environment of the robot, including: obtaining, with a processor of the robot, first data indicative of a presence or an absence of at least one human within the environment at a particular time; actuating, with the processor, the robot to execute work duties based on the first data, wherein: the robot executes the work duties when the first data indicates the absence of the at least one human from the environment; and the work duties comprise cleaning at least a portion of the environment; capturing, with at least one sensor of a plurality of sensors disposed on the robot, second data while the robot executes the work duties; and altering, with the processor, a navigational route of the robot or the work duties based on the second data.

Another aspect includes a robot including a tangible, non-transitory, machine readable medium storing instructions that when executed by a processor of the robot effectuates the operations described above.

Another aspect includes a tangible, non-transitory, machine readable medium storing instructions that when executed by a processor effectuates the operations described above.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF SOME EMBODIMENTS

Figure 1:
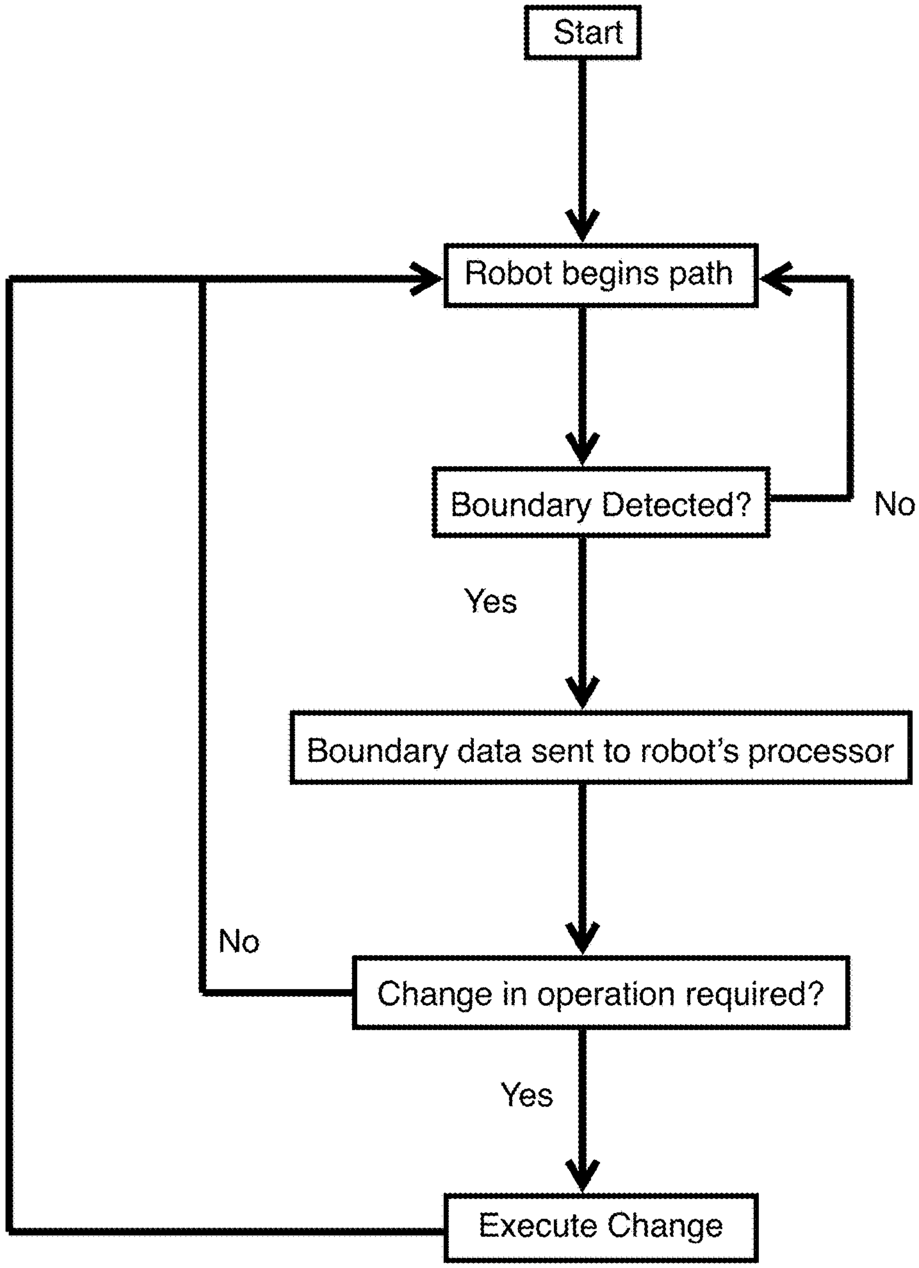
FIG. 1 illustrates the process by which a mobile robotic device detects a boundary edge between multiple work surface types and how it deals with the data collected, according to some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

The term "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The term "dynamic obstacle" shall hereinafter mean obstacles in a work environment that were not present in a prior operating cycle but are now present in a current operating cycle as well as obstacles that are present in a current operating cycle that were not present previously. Further "dynamic obstacle" will be intended to mean any and all obstacles that are moving at the time of operation including but not limited to pets, humans, other mobile robotic devices and the like. Additionally, obstacles which are invisible to the robot will also be included as "dynamic obstacles" including but not limited to obstacles that appear or disappear in regards to the mobile robotic device's sensors such as infrared, depth camera or any other sensor type included with the robot and the like.

Some embodiments include a method for mobile robotic devices to autonomously make decisions regarding the most efficient navigational and work duty plan for a work environment. In some embodiments, considerations regarding dynamic obstacles, the type of work surfaces present, and other relevant considerations are factored into this decision making. A processor of the mobile robotic device processes probabilities and all collected data regarding the work environment in order to create the most efficient plan of operation for a work environment.

In some embodiments, during operation, the processor of the mobile robotic device utilizes machine learning to process probabilities and autonomously determine where the mobile robotic device should operate as well as what operations should be partaken in. Information pertaining to work surface types as well as the presence or absence of dynamic obstacles in work areas are some, but not all of the considerations utilized in making these decisions. In some embodiments, the processor of the mobile robotic device utilizes data from prior work cycles to determine a navigational plan as well as a plan for work duties to be conducted. In some embodiments, the plan factors in various considerations to determine the most efficient navigational and work plan for conducting work duties. While performing work duties, sensors on the mobile robotic device collect new data. If the data suggests that the mobile robotic is required to alter its work and navigational plan, the mobile robotic device will do so and store the new data for future use.

In some embodiments, dynamic obstacles and floor type are detected by the processor of the mobile robotic device during work operation. As the mobile robotic device operates in the work environment, sensors arranged on the mobile robotic device collect information such as a type of work surface being operated on. For instance, for a mobile robotic cleaning device, the type of work surface being operated on can be quite important. For example, if a room has a thick pile rug as well as wood flooring, then this information is important for the operation of the mobile robotic cleaning device. In such a situation the presence of two differing work surfaces may make the operation of the mobile robotic cleaning device difficult as it has to adjust itself when it transitions from the taller elevation rug to the lower elevation wood floor. Additionally, the type of cleaning in such a situation may be different. For example, the cleaning on rug versus the cleaning on a wood floor may require different functions and may even elevate the pressure on the robot. For example, when a mobile robotic cleaning device operates on a rug, it may require a higher suctioning power or the brush may need to spin faster than when it is cleaning on a wood floor. Since debris can become stuck deep in the rug higher suctioning power may be necessary over that of a wood floor. Alternatively, a mobile robotic cleaning device that can vacuum as well as mop would result in different functions based on the floor type as the mobile robotic cleaning device is not going to mop the carpet. Additionally, a user may not wish for a mobile robotic device to operate on certain floor types. For example, a mobile robotic device that enters the home to deliver packages. A user may wish for such a mobile robotic device to only operate on a tiled surface but not that of a carpeted floor as the mobile robotic device would potentially track in dirt from outside and tile is easier to clean than carpet.

In some embodiments, as the mobile robotic device traverses the work environment the processor records the types of work surfaces in the work environment the mobile robotic device is operating in and where those work surfaces are located. The processor accesses this information during a live work cycle in order to assist with decision making. In some embodiments, to maximize the efficiency of a work operation of the mobile robotic device, the processor of the mobile robotic device autonomously determines probabilities based on data it has collected over time regarding the work surface types in rooms and what rooms it should operate in to maximize operational efficiency. For example, for a mobile robotic cleaning device, the processor may determine it is more efficient to clean the bedrooms first as they consist of a single work surface type, for example a carpeted surface, while other rooms contain multiple types of work surfaces and transitioning between multiple surface types would be burdensome and time consuming for the mobile robotic cleaning device. Further, in a similar situation, the processor of the mobile robotic cleaning device may determine that the robot should clean a hallway first as it consists of a wood floor and the wood floor can be cleaned quicker than rooms where the floor consists solely of carpet. Rooms with multiple floor types may be burdensome for the mobile robotic device. For example, for devices such as mobile robotic cleaning devices, operating in a room with multiple floor surface types may be burdensome for the robot because the robot must transition itself between different surface types resulting in different functionality, physically putting pressure on the robot, as well as lowering battery efficiency. As the robot traverses each edge or boundary from one surface type to another the mobile robotic cleaning device may need to switch the amount of power it utilizes to clean the different surface types by, for example, increasing suction power or brush rotation speed thereby wasting time and energy each time the robot transitions. Further, transitioning between different surface types may impact the angle of the mobile robotic cleaning device resulting in the brush and suction section missing contact with the work surface for a period of time as the robot is at an awkward angle during this transition period. In some embodiments, the mobile robotic cleaning device finishes cleaning a single surface type at a time before moving onto a different work surface type. With each cycle, the processor compiles such data to assist with decision making during the next operational cycle.

Figure 2:
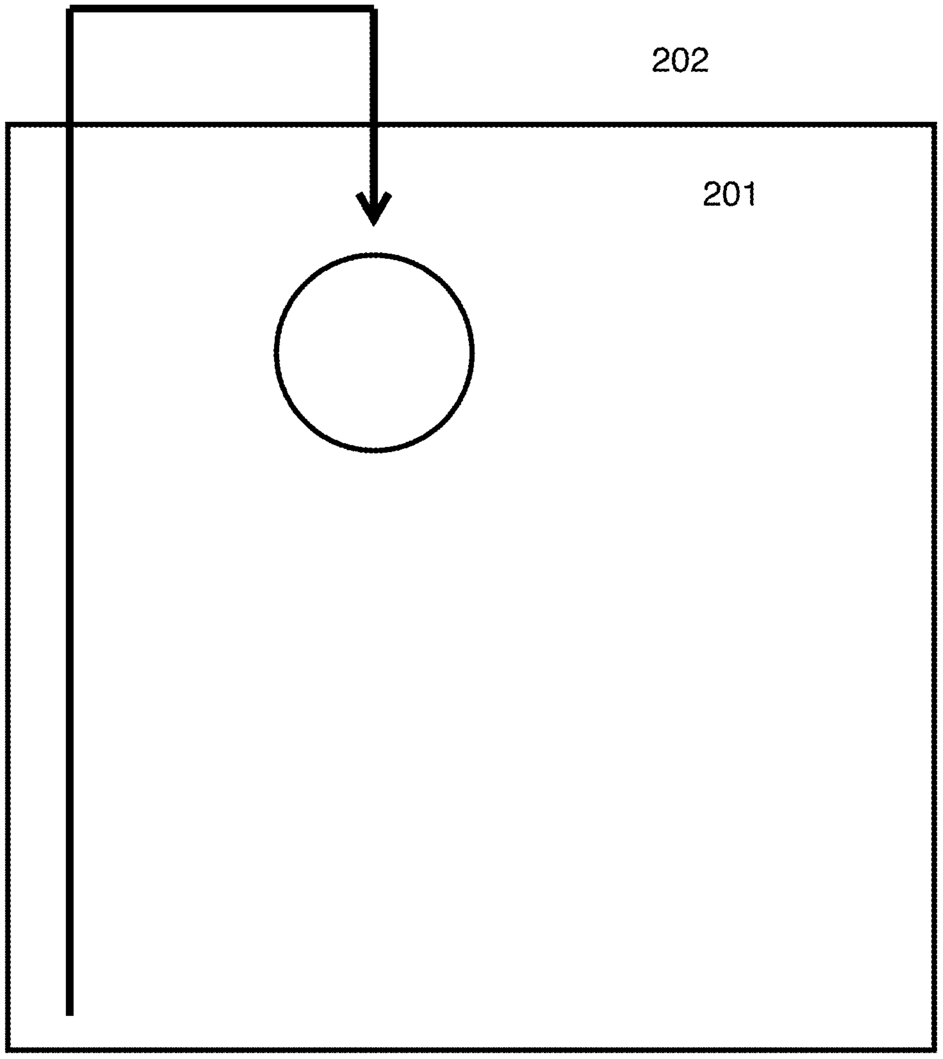
FIG. 2 illustrates an example of a mobile robotic device learning the boundary between two different work surface types, according to some embodiments.
Figure 3:
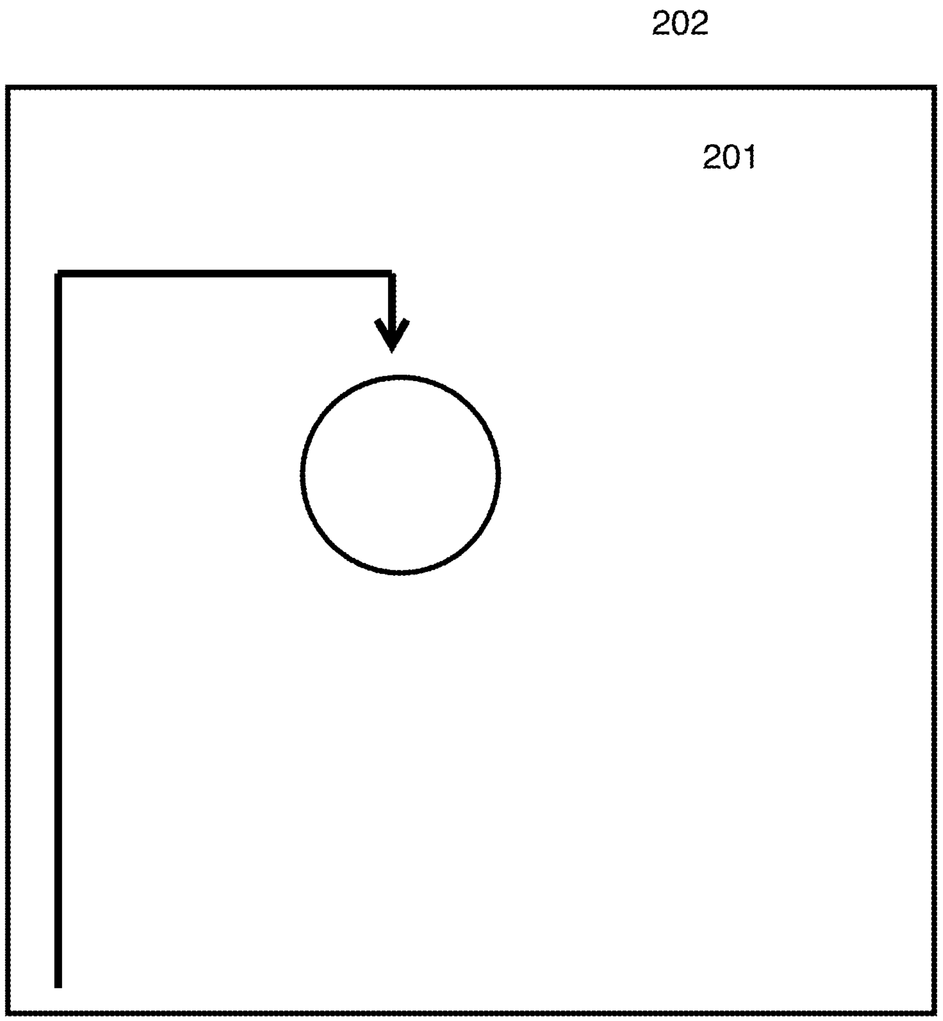
FIG. 3 illustrates an example of a mobile robotic device learning the boundary between two different work surface types, according to some embodiments.
Figure 4:
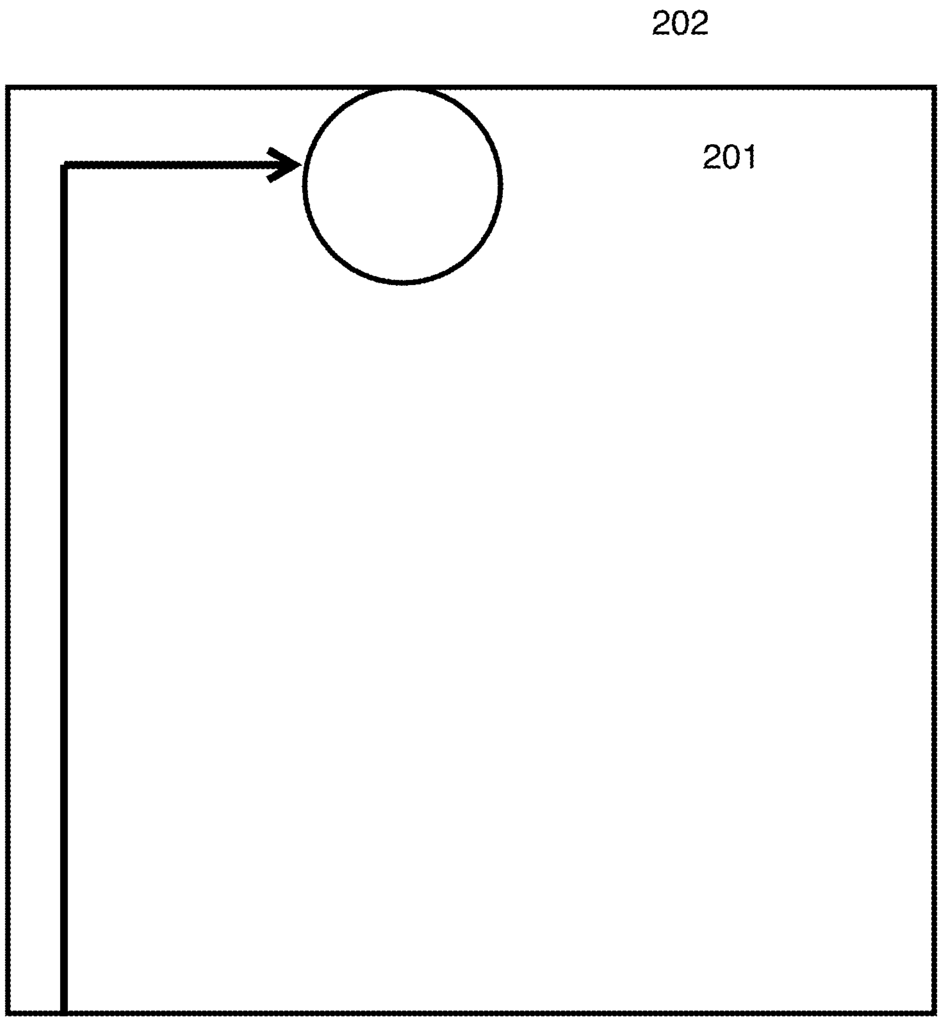
FIG. 4 illustrates an example of a mobile robotic device learning the boundary between two different work surface types, according to some embodiments.

In some embodiments, the mobile robotic device may operate on a single work surface type at a time even if multiple surface types are present in the same work area. For example, for a mobile robotic cleaning device, the mobile robotic cleaning device may determine that it is preferable to operate on rug before transferring to a wood floor. For a mobile robotic device that carries items, for example, the processor may determine that it is preferable for the robot to operate on a single surface type if it is carrying delicate materials as alternating between different surface types may make the items it is carrying unstable and susceptible to breaking when the mobile robotic device encounters the elevation change between the different surface types at their boundary or edge. Whatever the situation, during the course of normal operation the processor of the mobile robotic device learns the boundaries and edges between different work surface types. This process is demonstrated in FIG. 1. The processor of the mobile robotic device learns the boundaries between different surface types over a period of time as the robot performs multiple operational cycles in a given area. For example, as seen in FIG. 2, on a first day a mobile robotic cleaning device is attempting to completely clean a rug 201 that sits on top of a wood floor 202. The robot may clean beyond the boundary of the rug 201 and clean a small amount of the wood floor 202. The processor of the robot learns where the boundary is and stores this data. During the next cleaning cycle, after accessing the previous data, the mobile robotic cleaning device may once again clean beyond the boundary but the error margin may be smaller than on the first day. On a third day, the mobile robotic cleaning device may clean too short of the boundary between the rug 201 and wood floor 202, as seen in FIG. 3. Ultimately all of this data is compiled. On a fourth day, the mobile robotic device may then get the boundary right and only clean the rug area 201 but not the wood floor 202, as seen in FIG. 4. In some embodiments, the mobile robotic device may completely clean one work surface type before transferring over to clean the second work surface type. In some embodiments, the processor of the mobile robotic device compiles the data from each cleaning cycle to assess probabilities about where the robot should clean. The days for the processor of the mobile robotic device to learn the boundaries and edges of work surfaces are not intended to be predetermined. They are to be machine learned and the processor learns them at its own individual pace.

In some embodiments, the processor of the mobile robotic device autonomously generates a map based on the collected data of the work environment compiled over time. The processor creates and updates the map with new data after each additional work cycle.

In some embodiments, in an environment where multiple mobile robotic devices are present, the mobile robotic devices may share information pertaining to the specific location, type of work surface, as well as internal maps generated, and historical operational data with each other. In some embodiments, the processor of the mobile robotic device may learn the boundaries of work surfaces from the data shared from other mobile robotic devices. In some embodiments, the processor of the mobile robotic device confirms the boundary edges between surface types learned from other mobile robotic devices during normal working operation. In some embodiments, the processor of the mobile robotic device autonomously learns the boundaries between varying work surface types on its own even after boundaries have been shared by other mobile robotic devices.

In some embodiments, a user may use an application paired with the mobile robotic device. The user can thereafter diagram in a given work area where different work surface types are located in order to assist the mobile robotic device with detecting such work surfaces. The mobile robotic device will thereafter anticipate a work surface change before it encounters it for that location in the room. In some embodiments, the processor of the mobile robotic device autonomously learns the specific boundaries between varying work surface types despite the user marking the different work surface types.

Another aspect of the mobile robotic device operating at peak efficiency deals with interaction with dynamic obstacles. A mobile robotic device may act as a nuisance or safety hazard to dynamic obstacles such as a human and a pet and may interfere with the operation of other mobile robotic devices. In such a situation, it may be undesirable for the mobile robotic device to operate in the same vicinity at such a time. Additionally, dynamic obstacles may interfere with the operation on the part of the mobile robotic device itself. Therefore, to operate at peak efficiency, the mobile robotic device may attempt to limit interaction with dynamic obstacles when in operation if the interaction may cause issues.

In some embodiments, the processor of the mobile robot device marks the locations of obstacles, including dynamic obstacles, the robot has encountered in an internally generated map. In some embodiments, each time an obstacle is encountered the processor marks the location and nature of the obstacle on the internal map. In some embodiments, if an obstacle repeatedly appears over time, the processor of the mobile robotic device marks the obstacle as a permanent obstacle in the environment. In such a situation, the mobile robotic device expects the obstacle to be present during work operation. In some embodiments, in a situation wherein the obstacle is not present, the processor records the missing obstacle. In some embodiments, if this repeatedly occurs the processor marks the missing obstacle as a dynamic obstacle. In some embodiments, in a situation wherein the mobile robotic device may expect an area to not have an obstacle at all and one appears, the processor marks the obstacle as dynamic. In some embodiments, if an obstacle appears on some occasions but not others the processor marks the obstacle as a dynamic obstacle. In some embodiments, the processor of the mobile robotic device may mark obstacles that are unexpected, have disappeared or have unexpectedly appeared as dynamic obstacles.

In some embodiments, a mobile robotic device may encounter obstacles it has not encountered before in a location but which is close to where it routinely encounters obstacles. An example is a dining room chair. If the chair has been moved to a location that is close to where it is usually located but not a far distance, for example a foot or so, then the processor of the mobile robotic device may anticipate that this is merely the same chair that has been slightly moved out of place. In such a situation, the distance is not a predetermined distance but is up to the processor to autonomously determine whether or not to label such an obstacle as dynamic or not.

In some embodiments, when the mobile robotic device encounters dynamic obstacles that are moving, such as other mobile robotic devices, pets, humans and the like, the mobile robotic device will collect this data. The data collected may include but is not limited to what time this occurred, the date this occurred, where this occurred such as what room this occurred in, what was likely encountered such as whether this was a mobile robotic device, human, pet, piece of furniture or the like, and any other relevant information that the processor of the robot can utilize for cataloguing the encounter.

In some embodiments, when the mobile robotic device encounters an obstacle that is invisible to it, for example an obstacle that the sensors on the mobile robotic device were not able to detect, the mobile robotic device may catalog that obstacle as a dynamic obstacle.

In some embodiments, in areas with multiple historical occurrences of dynamic obstacles, the mobile robotic device will expect such a location to be a high volume traffic location. In some embodiments, the mobile robotic device catalogues data in regards to when these instances occur. For example, at 6 PM a mobile robotic device may encounter multiple humans in a kitchen or dining area on multiple occasions. In such a situation, the processor of the mobile robotic device internally note these encounters including information such as encountering multiple dynamic obstacles, the location of kitchen or dining area for the encounters, the time of 6 PM for the encounters, and the number of occasions the encounters occurred. In some embodiments, the processor of the mobile robotic device may rely on this information for future work cycles.

Figure 5:
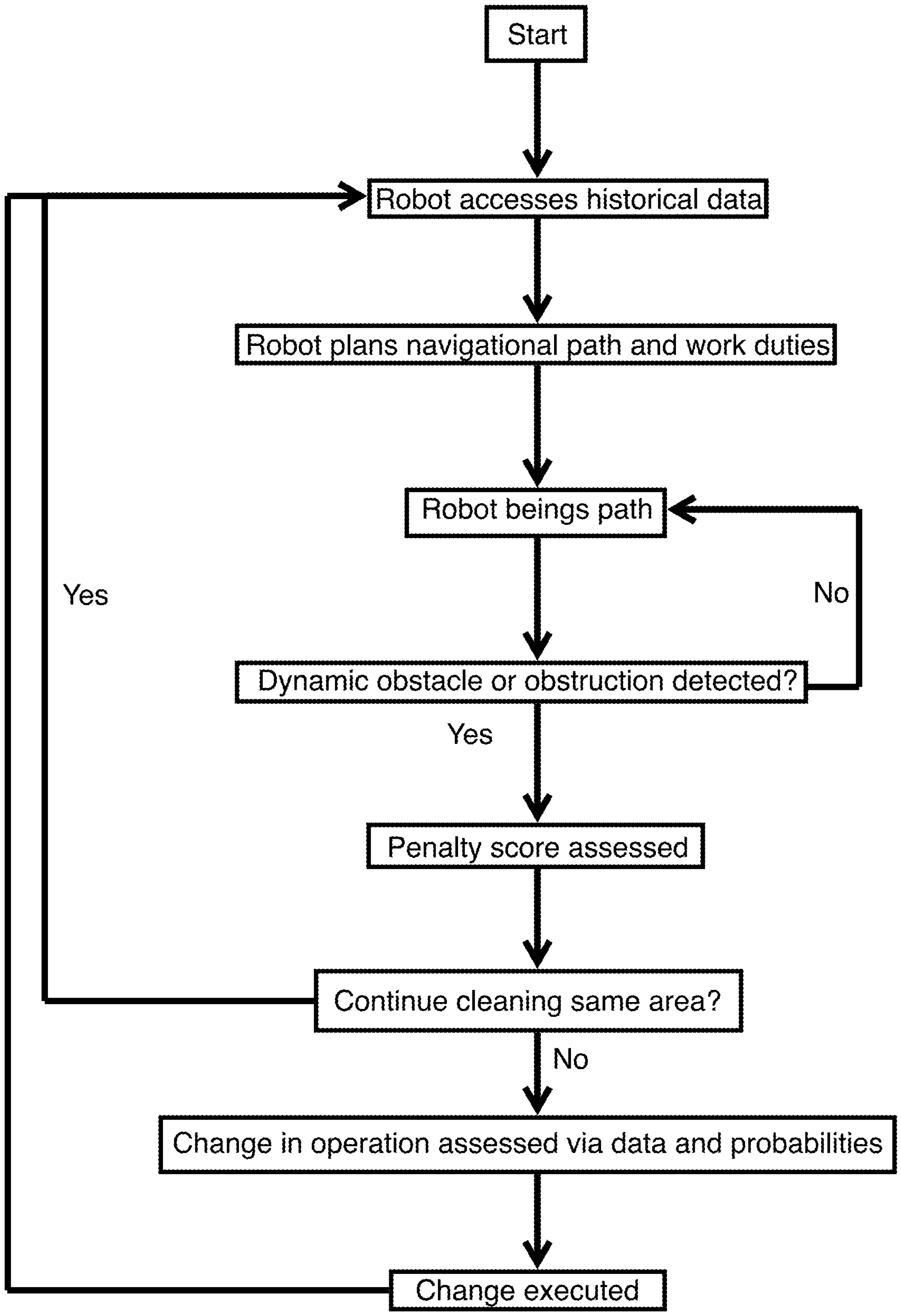
FIG. 5 illustrates how a mobile robotic device detects a dynamic obstacle in the work environment and the response process to such a detection, according to some embodiments.

In some embodiments, the presence of dynamic obstacles over a period of time is measured. In some embodiments, utilizing machine learning, the processor of the mobile robotic device processes probabilities and a number between 1 and 10 is assessed as a penalty score to a given room or work area to aid in determining what area is preferable to clean first. For example, if the mobile robotic device encounters a dynamic obstacle such as multiple individuals in a room at the same time on a given day, it may assign a high penalty score for that room. At such a time, the mobile robotic device may leave the room and attempt to operate job duties in a different room before returning to complete job duties in the room it previously assessed a high score for. On its way to or from the room with the high score, the mobile robotic device may encounter other rooms as well. When this occurs, the mobile robotic device may check on these other rooms. If the mobile robotic device checks these other rooms, it may enter and assess whether or not it is an optimal time to perform job duties in these rooms based on the presence of dynamic obstacles. If a dynamic obstacle is encountered a penalty score may be assessed for this particular time on the particular day for this particular room. The processor of the mobile robotic device may then determine whether or not to conduct a work duty in that room or whether to move on to another room. In some embodiments, over a predetermined amount of time, the penalty scores for rooms that have been assessed a penalty are reduced at a fixed rate over a fixed time interval. In some embodiments, the penalty scores for rooms are reduced every time the mobile robotic device performs a work duty in a different room. In some embodiments, when the penalty score for a particular room is lowered and reaches below a predetermined threshold, the mobile robotic device returns to the room with the lowered penalty score and attempts to perform work duties again in that room. In some embodiments, the mobile robotic device may encounter other rooms on the way to the room with the lowered penalty score and may attempt to perform job duties in those rooms first. If the robot returns to the room with lowered penalty score and encounters dynamic obstacles again, the processor of the mobile robotic device once again assesses a penalty score for the room and continues on to additional rooms. FIG. 5 demonstrates the process by which the processor of the mobile robotic device addressed the presence of dynamic obstacles.

In some embodiments, the mobile robotic device may avoid areas at particular times where historical data indicates the existence of a high volume of traffic or high likelihood of dynamic obstacles. For example, a mobile robotic cleaning device in a home running between 5 and 7 PM may avoid the kitchen and dining areas around 6 PM as the processor expects the robot to encounter humans. Instead, at 6 PM the processor of the mobile robotic cleaning device may deem it better to clean an office, bedroom, or other low traffic volume areas before returning to clean the kitchen and dining areas at 7 PM when the humans are no longer present.

In some embodiments, a user uses an application paired with the mobile robotic device to mark where items in a room are located. For example, for a dining area, a user marks where the table and chairs are located. In such a situation, when entering a given room, the mobile robotic device anticipates such obstacles to be in the room and the processor does not mark them as dynamic obstacles even if the robot has never encountered them before.

In some embodiments, a user uses an application paired with the mobile robotic device to indicate presence of humans, other mobile robotic devices, pets, or other dynamic obstacles in the area.

In some embodiments, in an environment where multiple mobile robotic devices are present, the mobile robotic devices may share information pertaining to the specific location, presence of dynamic obstacles, internal maps generated, and historical operational data with each other.

In some embodiments, the work area map including locations of rooms and layout is an important factor in regards to the peak efficiency of operation for the mobile robotic device. Based on the location of rooms or map layout the processor of the mobile robotic device may determine that the robot operate in particular rooms first as traveling to distant rooms is burdensome and consumes time and battery life. For example, for a mobile robotic cleaning device, it is determined that there is a high probability of a dynamic obstacle in a home office at a particular time but that there is a very low likelihood of a dynamic obstacle in bedroom 3, therefore the processor of the mobile robotic cleaning device determines to clean bedroom 3. However, in a map layout, bedroom 3 may be several rooms away. Therefore, in the interest of operating at peak efficiency, the mobile robotic cleaning device attempts to clean the hallway and bedrooms 1 and 2 on the way to bedroom 3. In an alternative situation, if the mobile robotic cleaning device determines that on the way to bedroom 3 that the hallway and bedroom 1 have a low probability of a dynamic obstacle but that bedroom 2 has a medium probability of a dynamic obstacle then the robot attempts to clean the hallway and bedroom 1 before checking on bedroom 2 to see if there is a dynamic obstacle present on the way to bedroom 3. In the same scenario, the mobile robotic device may simply determine to clean the hallway and bedroom 1 before skipping bedroom 2 on the way to cleaning bedroom 3. Once bedroom 3 has been cleaned the mobile robotic device may come back to check to see if bedroom 2 should be cleaned.

In some embodiments, in order to maximize efficiency, the amount of battery power left may play a factor in determining which work tasks and navigation patterns to perform. For example, for a mobile robotic cleaning device, if only one quarter battery life remains, the processor of the mobile robotic cleaning device may utilize this information to determine which work tasks to perform. For example, if a mobile robotic cleaning device has the option of cleaning a hallway with a wood surface, or cleaning a large living room with multiple surface types, the processor may determine based on battery power left that it would be optimal for the robot to completely clean the hallway and then recharge itself as the living room with multiple surface types would drain the battery to the point that the mobile robotic device would not be able to completely clean the room before charging. In some embodiments, the location of the mobile robotic device's docking or charging station may play a factor in the autonomous task decision making process of the mobile robotic device. For example, if a mobile robotic device has multiple tasks assigned but cannot complete all of them before it must recharge itself, the processor may determine the best actions to complete are those nearest to the docking or charging station rather than those which are farther away.

In some embodiments, when tasks were last completed in a given room may impact the autonomous decision process of the mobile robotic device. For example, for a mobile robotic cleaning device, the fact that some rooms were cleaned several weeks ago while others were cleaned only a week ago may impact the decision making process. In such a situation, the processor of the mobile robotic device may factor in and prioritize those work duties which have not been completed in quite some time over those that have been more recently completed.

In some embodiments, the processor of the mobile robotic device may determine decisions based on the amount of activity that takes place in a given room. For example, for a mobile robotic cleaning device, if human activity takes place more often in the living room than in a home office, the mobile robotic cleaning device may prioritize cleaning the living room on a more consistent basis as it will get dirty more quickly. Additionally, in some embodiments, for a mobile robotic cleaning device, historical data pertaining to the amount of debris historically collected in various locations may be considered into the prioritization of cleaning particular rooms over others.

In some embodiments, once this data has been catalogued it may be made available to a user. In some embodiments, a user may select areas for the mobile robotic device to operate in and the actions the mobile robotic device partakes in.

With all of this information compiled over time, the processor of the mobile robotic device determines the most efficient navigational and work duty plan autonomously. The processor determines which rooms to operate in and tasks to perform. For example, for a mobile robotic cleaning device, the compiled data impacts which rooms to clean, how to navigate to them, which type of cleaning to perform in them, and when to clean them. In some embodiments, the processor of the mobile robotic device autonomously creates a cleaning scheduling. Utilizing machine learning to process various probabilities, the scheduling focuses on achieving the most efficient manner for work tasks possible for the mobile robotic device. The data compiled over time includes, for example, work surface types, room locations, the presence or absence of dynamic obstacles, battery life and other relevant and the like data. In some embodiments, the processor of the mobile robotic device adds data from each cleaning cycle. If new data emerges from a given cleaning cycle that is different from prior historical data, it may impact how the mobile robotic device operates in future work cycles.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

The invention claimed is:

1. A method of autonomously navigating an environment by a cleaning robot to clean a surface of the environment, based on a first data indicative of a presence of a dynamic obstacle and a second data indicative of a floor type, the method comprising:

obtaining, with a processor of a cleaning robot, a first data from a plurality of sensors of the cleaning robot as the cleaning robot navigates an environment;

determining, with the processor of the cleaning robot, a presence of a dynamic obstacle based on the first data and an internally generated map of the environment stored on the cleaning robot;

actuating, with the processor of the cleaning robot, the cleaning robot to adjust a path of the cleaning robot in response to the presence of the dynamic obstacle;

obtaining, with the processor of the cleaning robot, a second data from the plurality of sensors of the cleaning robot as the cleaning robot navigates the environment;

determining, with the processor of the cleaning robot, a probability for a floor type of a surface of the environment, being of a certain floor type; and creating, with the processor of the cleaning robot, a boundary between different floor types based on collected data indicative of the floor type of the surface in different areas of the environment.

2. The method of claim 1, wherein the cleaning robot is configured to complete cleaning of a surface with a first floor type in a first area of the environment by executing a first cleaning operation before moving onto cleaning of a surface with a second floor type in a second area of the environment by executing a second cleaning operation.

3. The method of claim 1, further comprising:

obtaining, with the processor of the cleaning robot, a third data indicative of an existence of debris, and a level of debris accumulation associated with a location within the environment.

4. The method of claim 1, wherein:

the cleaning robot executes a mopping operation on a first side of the created boundary, wherein the floor type of the first side of the created boundary is determined as a hard floor; and the cleaning robot executes a vacuuming operation on a second side of the created boundary, wherein the floor type of the second side of the created boundary is determined as a carpeted floor.

5. The method of claim 1, further comprising:

generating, with the processor of the cleaning robot, a suggested cleaning schedule of the cleaning robot based on at least historical cleaning schedules of the cleaning robot, comprising at least a plurality of previous days and times the cleaning robot executed a cleaning session.

6. The method of claim 1, further comprising:

actuating, with the processor of the cleaning robot, the cleaning robot to adjust the path of the cleaning robot in response to determining the probability of the floor type of the surface in the environment the cleaning robot is about to drive on.

7. The method of claim 6, wherein the floor type of the surface in the environment the cleaning robot is about to drive on is a carpeted floor, and the cleaning robot avoids a carpeted floor when a mopping function is on.

8. The method of claim 1, further comprising:

transmitting, with the processor of the cleaning robot, the internally generated map of the environment to a smartphone running an application corresponding to the cleaning robot for displaying the map of the environment by the smartphone.

9. The method of claim 8, further comprising:

displaying, with the application running on the smartphone, the map of the environment wherein the floor types of the surface in the different areas of the environment are indicated in the map; and receiving, with the application running on the smartphone, at least one input designating an area within the map of the environment, wherein the cleaning robot is to execute a cleaning operation in that designated area.

10. The method of claim 1, further comprising:

storing, with the processor of the cleaning robot, data comprising at least the location of the dynamic obstacle in relation to the map of the environment.

11. The method of claim 1, further comprising:

storing, with the processor of the cleaning robot, data comprising at least times of encountering a dynamic obstacle.

12. The method of claim 1, further comprising:

determining, with the processor of the cleaning robot, an object type of a dynamic obstacle.

13. The method of claim 12, further comprising:

storing, with the processor of the cleaning robot, data comprising the object type of the dynamic obstacle.

14. The method of claim 12, wherein the object type of the dynamic obstacle is determined to be a human.

15. The method of claim 13, further comprising:

displaying, with the application running on the smartphone, the map of the environment wherein the encountered obstacles are marked on the map with an associated object type.

16. The method of claim 14, further comprising:

generating, with the processor of the cleaning robot, a suggested cleaning schedule based on an anticipated presence of at least one human using stored data comprising historical presence of humans in the environment.

17. The method of claim 14, further comprising:

adjusting, with the processor of the cleaning robot, a cleaning plan comprising order of cleaning areas of the environment based on an anticipated presence of at least one human using stored data comprising historical presence of humans in the environment.

18. The method of claim 14, further comprising:

actuating, with the processor of the cleaning robot, the cleaning robot to adjust the path of the cleaning robot in response to the presence of the at least one human.

19. The method of claim 18, wherein the adjusted path of the cleaning robot comprises avoiding operations in proximity of the at least one human in order to reduce a disturbance of the at least one human.

20. The method of claim 17, wherein the processor of the cleaning robot utilizes machine learning to anticipate times and areas of the environment at which the at least one human has a high probability to occupy based on historical data indicative of the presence of the at least one human in times and areas of the environment.

* * * * *